(12) United States Patent
Lundberg et al.

(10) Patent No.: US 9,383,009 B2
(45) Date of Patent: Jul. 5, 2016

(54) METHODOLOGY FOR CONTROLLING A HYDRAULIC CONTROL SYSTEM OF A CONTINUOUSLY VARIABLE TRANSMISSION

(71) Applicant: GM Global Technology Operations LLC, Detroit, MI (US)

(72) Inventors: Philip C. Lundberg, Keego Harbor, MI (US); Carlos E. Marin, Oxford, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/925,391

(22) Filed: Oct. 28, 2015

(65) Prior Publication Data

US 2016/0047471 A1    Feb. 18, 2016

Related U.S. Application Data

(63) Continuation of application No. 14/269,794, filed on May 5, 2014, now Pat. No. 9,188,218.

(60) Provisional application No. 61/829,336, filed on May 31, 2013.

(51) Int. Cl.
| | |
|---|---|
| *G06F 7/00* | (2006.01) |
| *F16H 61/662* | (2006.01) |
| *F16H 61/00* | (2006.01) |
| *F16H 61/14* | (2006.01) |
| *F16H 9/18* | (2006.01) |

(52) U.S. Cl.
CPC ............ *F16H 61/66272* (2013.01); *F16H 9/18* (2013.01); *F16H 61/0025* (2013.01); *F16H 61/0031* (2013.01); *F16H 61/14* (2013.01); *F16H 61/66254* (2013.01); *F16H 2061/0034* (2013.01); *F16H 2312/14* (2013.01)

(58) Field of Classification Search
CPC .......... F16H 61/0031; F16H 61/66272; F16H 61/14; F16H 61/66254; F16H 2061/0034; F16H 2312/14; F16H 9/18; F16H 61/0025
See application file for complete search history.

(56) References Cited

U.S. PATENT DOCUMENTS

| | | | | |
|---|---|---|---|---|
| 5,063,815 | A | * | 11/1991 | Oshidari ............. F16H 37/0846 477/38 |
| 5,188,007 | A | * | 2/1993 | Hattori ............. F16H 61/66272 474/1 |
| 5,201,687 | A | * | 4/1993 | Friedmann ........ F16H 61/66272 474/18 |
| 7,513,226 | B2 | | 4/2009 | Swain et al. |
| 8,062,175 | B2 | | 11/2011 | Krueger et al. |
| 8,069,661 | B2 | | 12/2011 | Hendrickson et al. |
| 8,225,687 | B2 | | 7/2012 | Lundberg et al. |
| 8,234,946 | B2 | | 8/2012 | Momal et al. |
| 8,356,529 | B2 | | 1/2013 | Lundberg et al. |
| 8,359,941 | B2 | | 1/2013 | Lundberg et al. |
| 8,375,710 | B2 | | 2/2013 | Mellet et al. |
| 8,382,626 | B2 | | 2/2013 | Moorman et al. |
| 8,402,855 | B2 | | 3/2013 | Lundberg et al. |
| 8,403,792 | B2 | | 3/2013 | Lundberg et al. |

(Continued)

*Primary Examiner* — David J Hlavka

(57) ABSTRACT

A hydraulic control system for a CVT may include a pressure regulator subsystem, a ratio control subsystem, a torque converter control (TCC) subsystem, a clutch control subsystem, and is enabled for automatic engine start/stop (ESS) functionality. A system and method are provided for performing an engine auto-stop in a vehicle having a CVT transmission and using an accumulator to fill the pulleys and clutches of the CVT, at least in part, during engine restart.

20 Claims, 6 Drawing Sheets

(56) References Cited

U.S. PATENT DOCUMENTS

| | | |
|---|---|---|
| 8,403,793 B2 | 3/2013 | Moorman et al. |
| 8,413,437 B2 | 4/2013 | Ghike et al. |
| 8,429,994 B2 | 4/2013 | Lundberg et al. |
| 8,435,148 B2 | 5/2013 | Moorman |
| 8,443,687 B2 | 5/2013 | Moorman |
| 8,464,851 B2 | 6/2013 | Moorman |
| 8,475,336 B2 | 7/2013 | Whitmarsh et al. |
| 8,500,600 B2 | 8/2013 | Moorman |
| 8,567,580 B2 | 10/2013 | Czoykowski et al. |
| 8,568,262 B2 | 10/2013 | Moorman et al. |
| 8,573,709 B2 | 11/2013 | Suzuki et al. |
| 8,579,094 B2 | 11/2013 | Moorman et al. |
| 8,579,753 B2 | 11/2013 | Heitzenrater et al. |
| 8,591,365 B2 | 11/2013 | Moorman et al. |
| 8,596,294 B2 | 12/2013 | Otanez et al. |
| 8,613,681 B2 | 12/2013 | Sowards et al. |
| 8,636,614 B2 | 1/2014 | Moorman et al. |
| 8,651,990 B2 | 2/2014 | Moorman et al. |
| 8,678,780 B2 | 3/2014 | Dougan et al. |
| 8,702,548 B2 | 4/2014 | Moorman |
| 8,738,257 B2 | 5/2014 | Moorman et al. |
| 8,775,039 B2 | 7/2014 | Chen et al. |
| 2004/0235616 A1 | 11/2004 | Janecke et al. |
| 2008/0176708 A1 | 7/2008 | Tamai et al. |
| 2009/0118885 A1 | 5/2009 | Heap et al. |
| 2009/0233762 A1 | 9/2009 | Choby |
| 2010/0106386 A1 | 4/2010 | Krasznai et al. |
| 2011/0146820 A1 | 6/2011 | Frerichs et al. |
| 2011/0318105 A1 | 12/2011 | Yang |
| 2012/0101699 A1 | 4/2012 | Boissinot et al. |
| 2012/0174570 A1 | 7/2012 | Xie et al. |
| 2012/0174998 A1 | 7/2012 | Grochowski |
| 2013/0118854 A1 | 5/2013 | Eber |
| 2013/0130859 A1 | 5/2013 | Lundberg et al. |
| 2013/0232962 A1 | 9/2013 | Marin et al. |
| 2013/0319155 A1 | 12/2013 | Berger |
| 2013/0324355 A1 | 12/2013 | Xie et al. |
| 2013/0327172 A1 | 12/2013 | Berger et al. |
| 2014/0034437 A1 | 2/2014 | Berger et al. |
| 2014/0038761 A1 | 2/2014 | Xu |
| 2014/0047828 A1 | 2/2014 | Benson et al. |
| 2014/0226421 A1 | 8/2014 | Kang |
| 2014/0357434 A1 | 12/2014 | Lundberg |
| 2015/0075314 A1 | 3/2015 | Gunderson |
| 2015/0233458 A1 | 8/2015 | Garcia et al. |
| 2015/0285371 A1 | 10/2015 | Schultz et al. |
| 2015/0308551 A1 | 10/2015 | Mellet et al. |
| 2015/0308552 A1 | 10/2015 | Mellet et al. |

\* cited by examiner

US 9,383,009 B2

METHODOLOGY FOR CONTROLLING A HYDRAULIC CONTROL SYSTEM OF A CONTINUOUSLY VARIABLE TRANSMISSION

CROSS-REFERENCE TO RELATED APPLICATIONS

This application is a continuation of Ser. No. 14/269,794 filed May 5, 2015 which claims the benefit of U.S. Provisional Application No. 61/829,336 filed May 31, 2013. The disclosure of the above applications are incorporated herein by reference.

TECHNICAL FIELD

The invention relates to a method for controlling a continuously variable transmission, and more particularly to method of controlling an electro-hydraulic control system of a continuously variable transmission to implement an automatic stop/start event.

BACKGROUND

A typical continuously variable transmission (CVT) includes a hydraulic control system that is employed to provide cooling and lubrication to components within the CVT and to actuate torque transmitting devices such as drive clutches or torque converter clutches, belt pulley positions. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices and the pulleys that move the belt of the CVT. The pressurized hydraulic fluid delivered to the pulleys is used to position the belt relative to input and output pulleys in order to obtain different gear ratios.

A CVT may have a primary and a secondary pulley set connected by a belt or other power transmission device. In order to adjust the primary or secondary pulley set, the respective axially movable pulley is actuated with a pressure medium from a pressure source. The ratio of the CVT is changed by reducing or increasing the pressure acting on one of the sheave halves of one of the pulleys, generally the input pulley, while the pressure at the other pulley may be maintained substantially constant. The continuously variable unit requires a high pressure to ensure sufficient clamping forces for the belt and pulley mechanism, as slippage of the belt against the pulleys is often undesirable. The amount of clamping pressure required is a function of the input torque to the transmission and the ratio at which the variable transmission unit is operating. If the clamping pressure is low, there is a possibility of belt slippage.

The control pressure level required to engage the torque transmitting mechanisms is generally lower than the pressure required to control the CVT pulleys. The amount of pressure required in the torque transmitting mechanisms is essentially a function of torque being transmitted and size of the conventional clutch hardware, consisting of a movable piston and a clutch pack. If the control pressure is below the required value, slippage of the friction plates can occur, which will shorten the life of the torque transmitting mechanisms.

In order to increase the fuel economy of motor vehicles having conventional planetary gear automatic transmissions, it has been desirable to stop the engine during certain circumstances, such as when stopped at a red light or idling. However, after the engine has been shut down and has remained off for an extended period of time, the fluid generally tends to drain down from the passages into a transmission sump under the force of gravity. Upon engine restart, the transmission may take an appreciable amount of time to establish pressure before full transmission operation may resume. Such engine start/stop algorithms have typically not been used in CVT transmission systems due to the extra amount of time and fluid pressure that it would take to bring the CVT transmission up to the pressure that it needs to properly operate the pulleys without belt slippage.

SUMMARY

A hydraulic control system and method for a CVT is provided. The hydraulic control system may include, for example, a pressure regulator subsystem, a ratio control subsystem, a torque converter control (TCC) subsystem, and a clutch control subsystem. The hydraulic control system is enabled for automatic engine start/stop (ESS) functionality. An accumulator is used to fill the pulleys and CVT clutches of a CVT transmission, enabling the vehicle to quickly launch after a vehicle restart. In some variations, the system and method includes passively feeding an accumulator when line pressure is above accumulator pressure. A pump ball check-valve (or other one-way valve) may prevent draindown of the pulley and CVT clutch pressure.

The system and method may include steps for ensuring that the CVT control system will be able to restart the system with little delay. For example, the system and method may include steps of: determining the accumulator stored volume; determining whether the accumulator is filled; determining whether a vehicle stop has occurred; determining whether an engine autostop is advisable/allowable, based on vehicle conditions; determining whether transmission conditions are appropriate for an autostop, or in the alternative, would inhibit an autostop; and allowing the autostop to happen. In another variation, the system and method may include steps of: determining whether the pump output model indicates that the accumulator can be actively filled by the system without compromising hydraulic control system performance; opening an accumulator solenoid; determining the accumulator stored volume; determining whether the accumulator is filled; determining whether a vehicle stop has occurred; determining whether an engine autostop is advisable/allowable, based on vehicle conditions; determining whether transmission conditions are appropriate for an autostop, or in the alternative, would inhibit an autostop; and allowing the autostop to happen.

In still another variation, the system and method may include steps for restarting the system after an autostop. For example, the system and method may include steps of: receiving an "engine on" command; enabling a pulley fill pressure solenoid command; enabling an accumulator solenoid on command; enabling a CVT clutch fill pressure solenoid command; determining whether the pulleys are filled; if so, filling the CVT clutch(es) to capacity; determining whether the CVT pulleys and clutches are filled; determining whether the engine is at or above idle speed; and closing the accumulator solenoid or turning off the accumulator solenoid. The method may also include implementing regular pulley control and CVT clutch control algorithms.

Further aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1A:
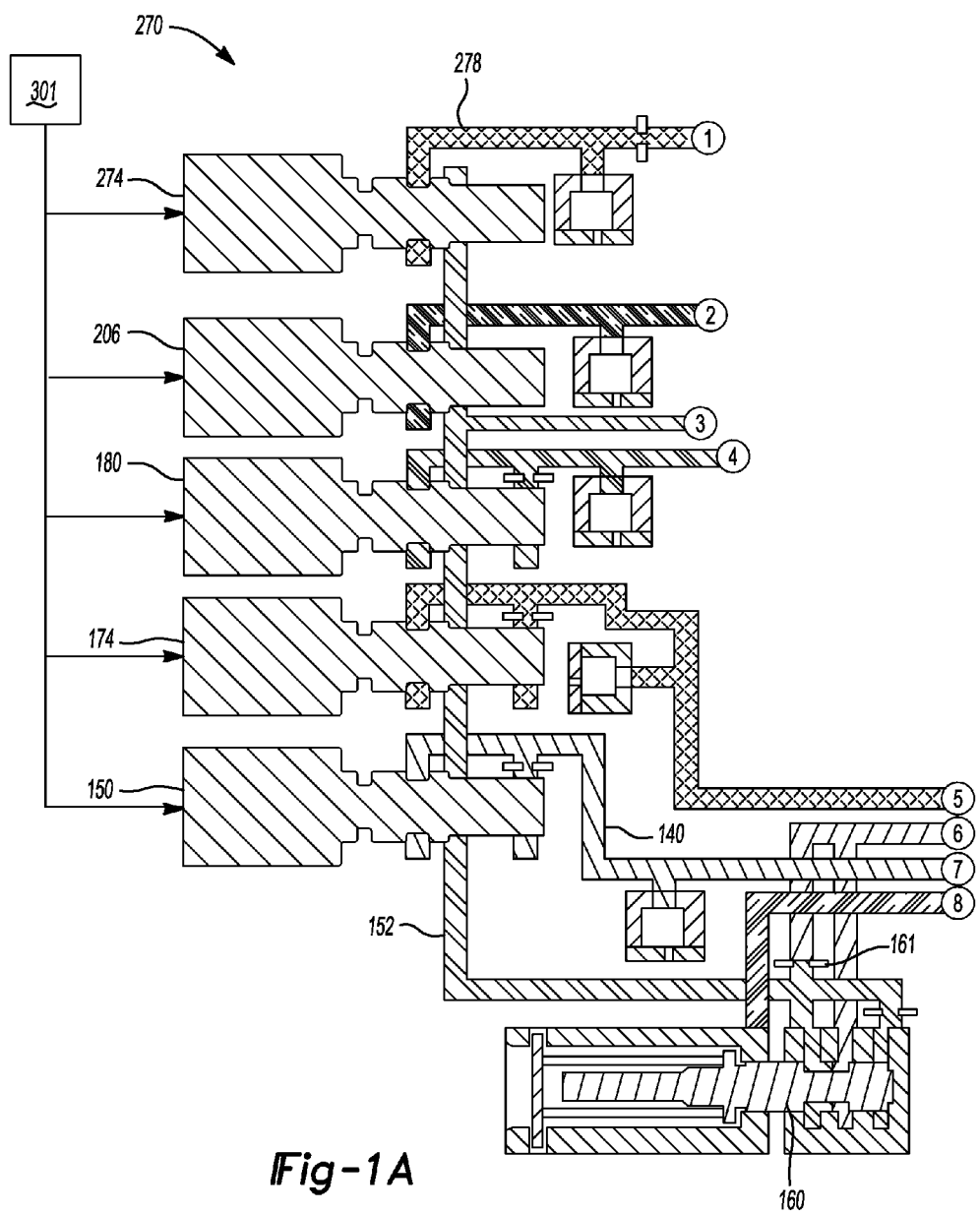
FIG. 1A is diagram of a portion of a hydraulic control system, according to the principles of the present disclosure.
Figure 1B:
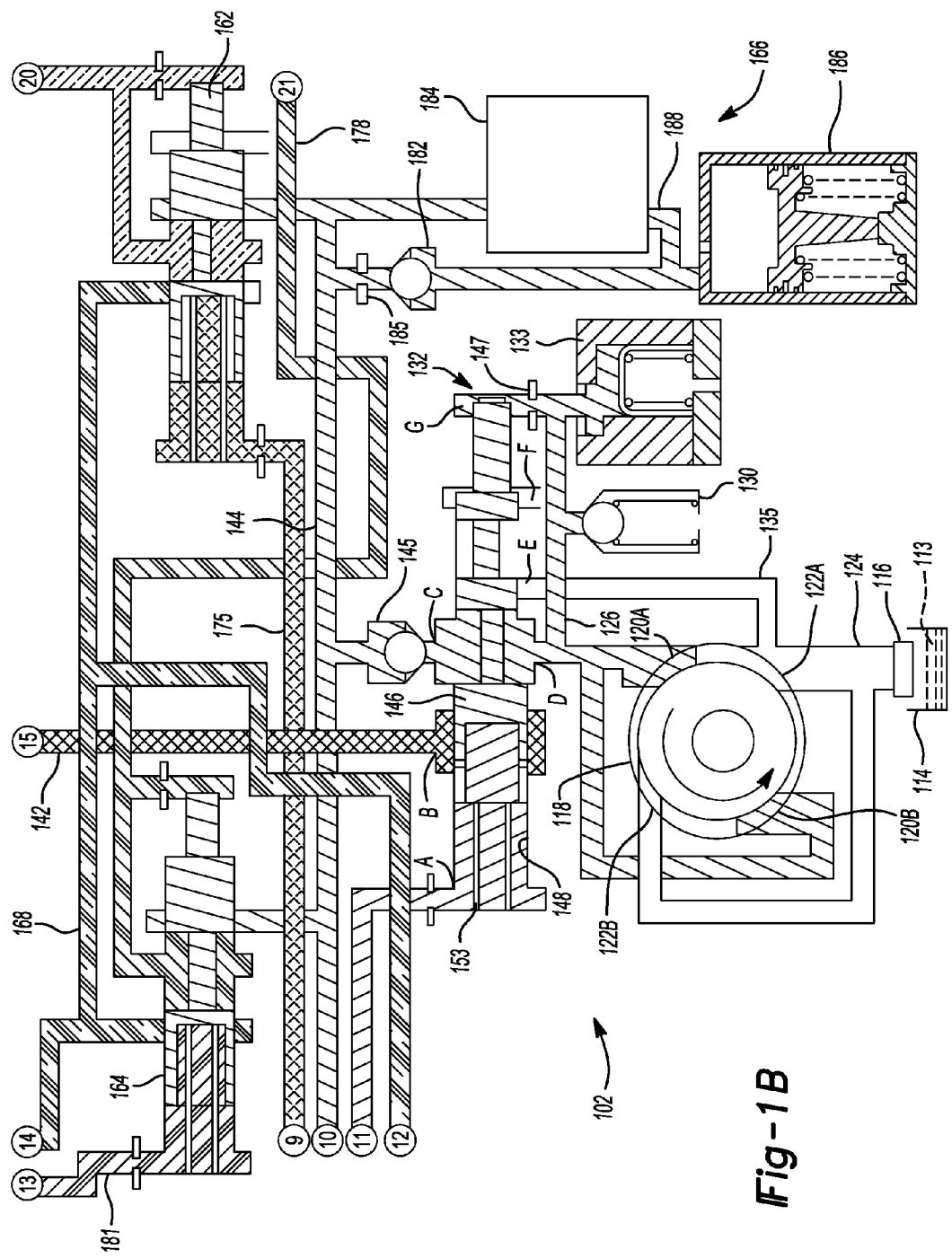
FIG. 1B is diagram of another portion of the hydraulic control system, according to the principles of the present disclosure.
Figure 1C:
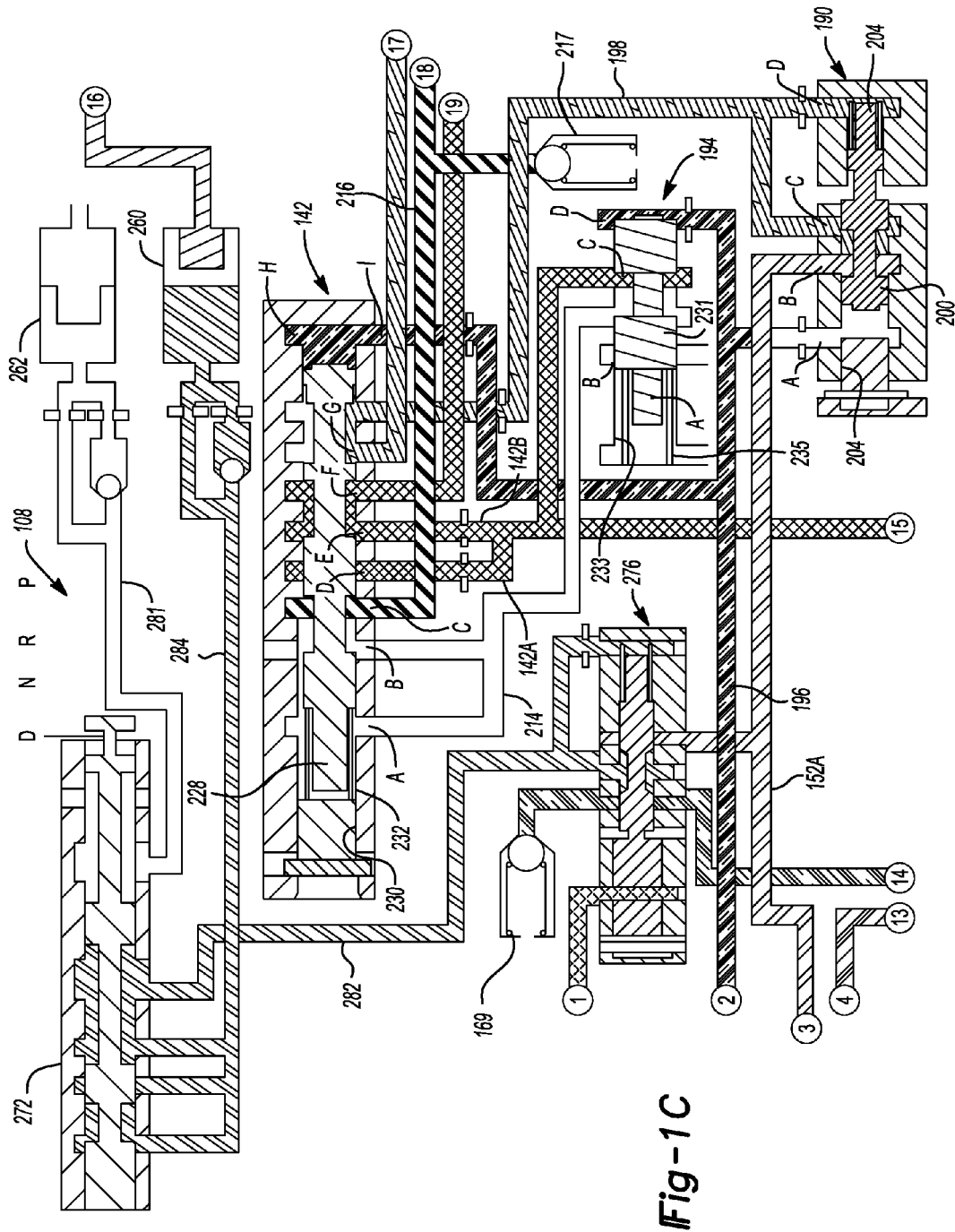
FIG. 1C is diagram of another portion of the hydraulic control system, according to the principles of the present disclosure.
Figure 1D:
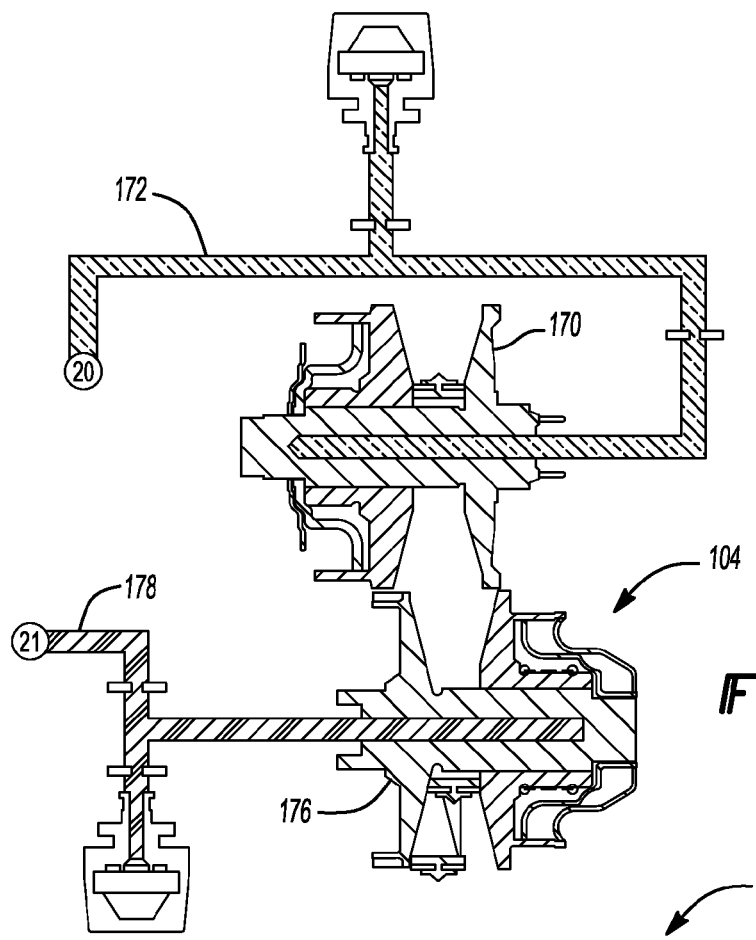
FIG. 1D is diagram of another portion of the hydraulic control system, according to the principles of the present disclosure.
Figure 1E:
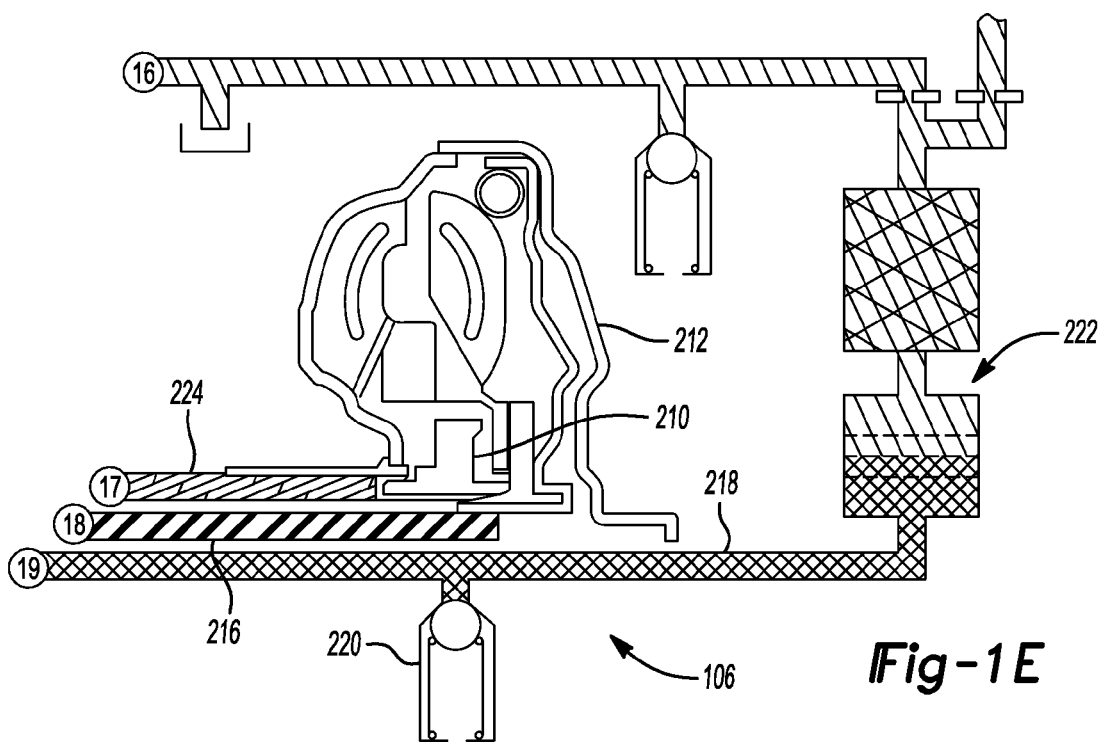
FIG. 1E is diagram of another portion of the hydraulic control system, according to the principles of the present disclosure.

With reference to FIGS. 1A-1E, a hydraulic control system according to the principles of the present disclosure is generally indicated by reference number 100. The hydraulic control system 100 includes a plurality of interconnected or hydraulically communicating circuits or subsystems including a pressure regulator subsystem 102, a ratio control subsystem 104, a torque converter control (TCC) subsystem 106, and a clutch control subsystem 108.

The pressure regulator subsystem 102 is operable to provide and regulate pressurized hydraulic fluid 113, such as oil, throughout the hydraulic control system 100. The pressure regulator subsystem 102 draws hydraulic fluid 113 from a sump 114. The sump 114 is a tank or reservoir preferably disposed at the bottom of a transmission housing to which the hydraulic fluid 113 returns and collects from various components and regions of the transmission. The hydraulic fluid 113 is forced from the sump 114 and communicated through a sump filter 116 and throughout the hydraulic control system 100 via a pump 118. The pump 118 is preferably driven by an engine (not shown) and may be, for example, a gear pump, a vane pump, a gerotor pump, or any other positive displacement pump. In one example, the pump 118 includes outlet ports 120A and 120B and inlet ports 122A and 122B. The inlet ports 122A and 122B communicate with the sump 114 via a suction line 124. The outlet ports 120A and 120B communicate pressurized hydraulic fluid 113 to a supply line 126.

The supply line 126 communicates hydraulic fluid from the pump 118 to a spring biased blow-off safety valve 130, to a pressure regulator valve 132, and to an optional accumulator 133. The safety valve 130 is set at a relatively high predetermined pressure and if the pressure of the hydraulic fluid in the supply line 126 exceeds this pressure, the safety valve 130 opens momentarily to relieve and reduce the pressure of the hydraulic fluid.

The pressure regulator valve 132 is configured to bleed off pressure from the main supply line 126 to a return line 135. The return line 135 communicates with the suction line 124. The pressure regulator valve 132 includes ports 132A-G. Port 132A is in communication with a signal fluid line 140. Port 132B is in communication with a TCC feed line 142. Ports 132C is in communication with a main supply line 144 through a one-way check valve 145. Port 132D is in communication with the supply line 126. Port 132E is in communication with the bypass line 135. Port 132F is an exhaust port and is in communication with the sump 114 or an exhaust backfill circuit. Port 132G is in communication with the supply line 126 through a flow restriction orifice 147.

The pressure regulator valve 132 further includes a spool 146 slidably disposed within a bore 148. The pressure regulator valve 132 also provides hydraulic fluid to the TCC feed line 142. The spool 146 automatically changes position to dump excess flow from the supply line 126 to the TCC feed line 142 and then additional excess flow to the return line 135 until a pressure balance is achieved between a commanded pressure and the actual pressure. The spool 146 is modulated by a line pressure control solenoid 150 that communicates with the signal line 140. The line pressure control solenoid 150 receives hydraulic fluid from a solenoid feed line 152 and is preferably a low flow, normally high variable force solenoid. The solenoid 150 commands a fluid pressure by sending pressurized hydraulic fluid to port 132A to act on the spool 146. Simultaneously, fluid pressure from the main fluid line 126 enters port 132G and acts on the opposite side of the spool 146. Pressure balance between the commanded pressure from the solenoid 150, pressure within the main supply line 126 and a spring 153 is achieved as the spool 146 moves and allows selective communication between port 132D and port 132E and port 132D and port 132C and between port 132D and port 123B. Under higher pressure from the pump 118, the pressure regulator valve fully strokes and pressure bleeds from port 132D to port 132B to feed the TCC subsystem 106 while fully opening flow to port 132E.

The main supply line 144 communicates hydraulic fluid from the pressure regulator valve 132 to an actuator feed limit valve 160, a first or primary pulley valve 162, a secondary pulley valve 164, and a ESS subsystem 166. The one way valve 145 prevents hydraulic flow into the main pump 118 when the main pump 118 is non-operational.

The actuator feed limit valve 160 is connected between the main supply line 144 and the solenoid feed line 152. The actuator feed limit valve 160 limits the maximum pressure of the hydraulic fluid supplied to the solenoid feed line 152 by selectively closing a direct connection between the main supply line 144 and the solenoid feed line 152 and forcing the main supply line 144 to communicate with the solenoid feed line 152 through a flow restriction orifice 161. The actuator feed limit valve 160 exhausts to a backfill circuit 168 that communicates with a blow-off valve 169. The blow-off valve 169 is set at a predetermined pressure and if the pressure of the hydraulic fluid in the backfill circuit 168 exceeds this pressure, the blow-off valve 169 opens momentarily to relieve and reduce the pressure of the hydraulic fluid.

The primary pulley valve 162 and the secondary pulley valve 164 form part of the ratio control subsystem 104. The primary pulley valve 162 selectively controls hydraulic fluid flow from the main supply line 144 to a primary pulley 170 via a primary pulley feed line 172. The primary pulley valve 162 is modulated by a primary pulley control solenoid 174 that communicates with a signal line 175. The primary pulley control solenoid 174 receives hydraulic fluid from the solenoid feed line 152 and is preferably a normally high variable force solenoid. The solenoid 172 commands a primary pulley position by sending pressurized hydraulic fluid to act on the primary pulley valve 162 which in turn controls the amount of hydraulic fluid from the main supply line to the primary pulley 170. The primary pulley valve 162 exhausts into the exhaust backfill circuit 168.

The secondary pulley valve 164 selectively controls hydraulic fluid flow from the main supply line 144 to a secondary pulley 176 via a secondary pulley feed line 178. The secondary pulley valve 164 is modulated by a secondary pulley control solenoid 180 that communicates with a signal line 181. The secondary pulley control solenoid 180 receives hydraulic fluid from the solenoid feed line 152 and is preferably a normally high variable force solenoid. The solenoid 180 commands a secondary pulley position by sending pressurized hydraulic fluid to act on the secondary pulley valve 164 which in turn controls the amount of hydraulic fluid from the main supply line to the secondary pulley 176. The secondary pulley valve 164 exhausts into the exhaust backfill circuit 168. Translation of the pulleys 170, 176 correlates to movement of a belt (not shown) in the CVT which varies the output or gear ratio of the CVT.

The ESS subsystem 166 provides hydraulic fluid pressure to the main supply line 144 during an automatic engine stop/start event where the engine is automatically shut off during certain operating conditions. During this event, the engine driven pump 118 is also shut off, thereby leading to a drop in pressure within the main supply line 144. The exhaust backfill circuit 168 minimizes the drain out of the main supply line 144. However, during engine restart, lag in pump operation can lead to unwanted shift delay. The ESS subsystem 166 assures immediate pressure to certain systems. The ESS subsystem 166 includes a one-way valve 182, an on/off solenoid 184, a flow restriction orifice 185, and an accumulator 186. The one-way valve 182 is connected to the main supply line 144 and to an accumulator line 188. The one-way valve 182 allows fluid flow from the main supply line 144 to the accumulator line 188. The on/off solenoid 184 is disposed in parallel with the one-way valve 182 and communicates between the main supply line 144 and the accumulator line 188. The on/off solenoid 184 opens to release the stored fluid within the accumulator 186. The accumulator 186 is connected to the accumulator line 188. The accumulator 186 is an energy storage device in which the non-compressible hydraulic fluid 113 is held under pressure by an external source. In the example provided, the accumulator 186 is a spring type or gas filled type accumulator having a spring or compressible gas or both that provides a compressive force on the hydraulic fluid 113 within the accumulator 186. However, it should be appreciated that the accumulator 186 may be of other types, such as a gas-charged type, without departing from the scope of the present invention. As noted above, the accumulator 186 is charged through the one-way valve 182 and orifice 185 during normal operation of the CVT. The accumulator 186 is released when the solenoid 184 is opened during the start phase of an engine stop/start event.

The TCC subsystem 106 includes a TCC regulator valve 190, a converter control valve 192, and a TCC fault valve 194. The TCC regulator valve 190 includes ports 190A-D. Port 190A communicates with a signal line 196. Port 190B communicates with a branch 152A of the solenoid supply line 152. Port 190C communicates with a converter feed line 198. Port 190D is the feedback port and communicates with converter feed line 198.

The TCC regulator valve 190 further includes a spool 200 slidably disposed within a bore 202. The spool 200 is biased (i.e. de-stroked) by a spring 204. The spool 200 automatically changes position to regulate flow from the solenoid supply line 152A to the converter feed line 198 until a pressure balance is achieved between a commanded pressure and the actual pressure. The commanded pressure is commanded by a TCC regulation solenoid 206. The spool 146 is modulated by the TCC regulation solenoid 206 that communicates a hydraulic fluid signal to the signal line 196. The TCC regulation solenoid 206 receives hydraulic fluid from the solenoid feed line 152 and is preferably a low flow, normally low variable force solenoid. The solenoid 206 commands a fluid pressure by sending pressurized hydraulic fluid to port 190A to act on the spool 200. Simultaneously, fluid pressure from the converter feed line 198 enters port 190D and acts on the opposite side of the spool 200. Pressure balance between the commanded pressure from the solenoid 206, pressure within the converter feed line 198 and the spring 204 is achieved as the spool 200 moves and allows selective communication between port 190B and 190C. It should be appreciated that solenoid 206 and valve 190 can become a single high flow, normally low variable force solenoid without departing from the scope of the present invention.

The TCC control valve 192 controls the engagement of a torque converter clutch 210 within a torque converter 212. The TCC control valve 192 includes ports 192A-I. Ports 192A and 192B communicate with a fault feed line 214. Port 192C communicates with a TCC release line 216. The TCC release line 216 communicates with a blow-off valve 217 and releases the torque converter clutch 210 when pressurized hydraulic fluid is received. Ports 192D and 192E communicate with parallel branches 142A and 142B of the TCC feed line 142. Port 192F communicates with a cooler line 218. The cooler line 218 communicates with a blow-off valve 220 and an oil cooler subsystem 222. Port 192G communicates with a TCC apply line 224. The TCC apply line 224 applies the torque converter clutch 210 when pressurized hydraulic fluid is received. Port 192H communicates with the converter feed line 198. Port 192I communicates with the signal line 196.

The TCC control valve 192 includes a spool 228 slidably disposed within a bore 230. The TCC control valve 192 is controlled by the TCC regulation solenoid 206 via the signal line 196. The TCC regulation solenoid 206 toggles the spool 228 between an "apply" and "release" state. In the "apply" state the spool 228 is moved to the left against the bias of a spring 232 and the apply line 224 is fed hydraulic fluid from the converter feed line 198 via communication of ports 192G and 192H. In the "apply" state port 192E communicates with port 192F to supply fluid from the feed line 142 to the cooler line 218 while port 192B exhausts the converter 210 through the fault feed line 214 and the fault valve 190. In the "release" state the spool 228 is moved to the right (i.e. stroked by the spring 232) and port 192G communicates with port 192F to communicate the hydraulic fluid within the apply line 224 to the cooler line 218. In the "release" state port 192D communicates with port 192C to communicate hydraulic fluid from the converter feed line 142 to the release line 216 and port 192B is closed.

The TCC fault valve 194 assures that hydraulic fluid is provided to the release line to keep the torque converter 212 filled with hydraulic fluid. The TCC fault valve 194 includes ports 194A-D. Port 194A is an exhaust port that communicates with the sump 114. Port 192B communicates with the fault feed line 214. Port 194C communicates with a branch 142C of the converter feed line 142. Port 194D communicates with the signal line 196.

The TCC fault valve 194 includes a spool 231 slidably disposed within a bore 233. The position of the spool 231 is controlled by a signal received from the TCC regulation solenoid 206 via port 194D. The spool 231 moves between a first position and a second position. In the first position the spool 231 is moved to the right by the bias of a spring 235 and port 194C allows fluid communication between the converter feed line 142 and the fault line 214, thereby pressurizing converter fault line 214, assuring that hydraulic fluid is available to the release line 218 in the unlikely event that the spool 228 of the TCC control valve 192 sticks in the "apply" state. In the second position the spool 230 is moved to the left against the bias of the spring 235 and port 194C is closed and 194A is open to exhausts. By opening exhaust port 194A, fluid is exhausted from within the converter feed line 142.

The clutch control subsystem 108 controls engagement of a Drive clutch actuator 260 and a Reverse clutch actuator 262. The Drive clutch actuator 260 and the Reverse clutch actuator 262 are controlled by a solenoid valve assembly 270 and a manual valve 272. The solenoid valve assembly 270 includes a clutch control solenoid 274 and a regulator valve 276. The solenoid 274 receives hydraulic fluid from the solenoid supply line 152 and is connected to a signal line 278. The regulator valve 276 is fed oil from the branch 152A of the solenoid supply line 152. The clutch control solenoid 274 is preferably a low flow, normally low variable flow solenoid. The solenoid 274 selectively communicates the oil to the signal line 278 in order to move the regulator valve 276. The regulator valve 276 in turn selectively communicates the oil from the solenoid supply line 152A to a feed line 282. It should be appreciated that solenoid 275 and valve 276 can become a single high flow, normally low variable force solenoid without departing from the scope of the present invention.

The manual valve 272 communicates with the feed line 282, a Reverse line 281, and with a Drive line 284. Movement of a range selector of an operator of the motor vehicle in turn translates the manual valve 272 between various positions including a Reverse position and a Drive position. In the Drive position, the feed line 282 communicates with the Drive line 284. In the Reverse position the feed line 282 communicates with the Reverse line 281. The Drive line 282 communicates with the Drive clutch actuator 260 while the Reverse line 281 communicates with the Reverse clutch actuator 260.

Figure 2:
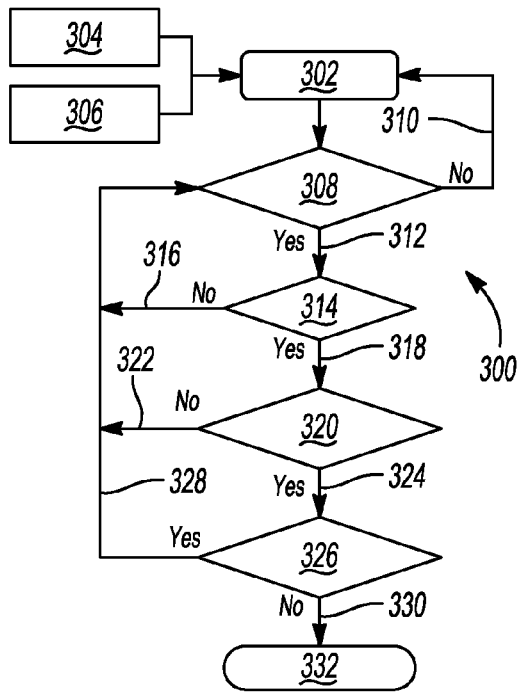
FIG. 2 is a block diagram illustrating steps of a method of operating the hydraulic control system of FIG. 1, in accordance with the principles of the present disclosure.

Turning now to FIG. 2 and with continued reference to FIGS. 1A-1E, a method 300 of enabling engine start/stop is illustrated and described in a flow chart. The method 300 may be implemented by the hydraulic control system 100, including through the use of one or more controllers 301, shown in FIG. 1A. The controller 301 is a specialized computer or control module such as a transmission control module (TCM), an engine control module (ECM), or a hybrid control module, or any other type of controller. The controller 301 is preferably an electronic control device having a preprogrammed digital computer or processor, control logic, memory used to store data, and at least one I/O peripheral. The control logic includes a plurality of logic routines for monitoring, manipulating, and generating data.

The method 300 includes a step 302 of determining the stored volume in an accumulator (accumulator fill volume), such as the accumulator 186. The stored volume in the accumulator 186 may be determined by determining the pressure at which the line pressure command is set (box 304) and determining the time at which the line pressure command is set (box 306). For example, if the accumulator 186 is filled passively through the one-way valve 182, an algorithm may determine the stored volume in the accumulator 186 by considering the pressure of the line pressure command and the time at which the line pressure command was set. In the alternative, the stored volume of the accumulator 186 could be determined in any other suitable manner, such as through use of a sensor (not shown). Based on the stored volume in the accumulator 186 determined in step 302, the system 100 or method 300 determines whether the accumulator 186 is filled in step 308 by comparing the accumulator stored volume to an accumulator fill volume. If the accumulator stored volume is equal to or approximately equal to the accumulator fill volume, then the accumulator is filled and fully charged.

If the accumulator 186 is not filled, the method 300 follows a path 310 back to step 302, wherein the method 300 or system 100 determines the accumulator stored volume 302, and then proceeds to step 308 as described above. If in step 308, the system 100 or method 300 determines that the accumulator 186 is filled, then the method 300 follows a path 312 to a step 314. In the step 314, the method 300 includes determining whether a vehicle stop has been detected. The autostop only occurs if the vehicle has been stopped. If a vehicle stop has not been detected in step 314, the method 300 follows a path 316 back to step 308. If however, a vehicle stop has been detected in step 314, then the method 300 proceeds along a path 318 to a step 320.

In step 320, the method 300 includes determining whether a vehicle autostop is allowed. This step 320 may include considering such factors as: whether the cabin air conditioning is on or off, the ambient temperature range, the battery voltage or charge level, and vehicle speed, by way of example. For example, the method 300 or system 100 may determine that vehicle autostops are not allowed if the air conditioning is on, if the ambient temperature is outside of a predetermined ambient temperature range, if the battery is not sufficiently charged, and/or if a vehicle speed exceeds a vehicle speed threshold. Such information may come from another controller, by way of example. If the method 300 or system 100 determines that vehicle autostops are not allowed in step 320, the method 300 follows a path 322 back to step 308, and the method 300 proceeds from step 308. If however, the method 300 or system 100 determines that vehicle autostops are allowed, the method 300 follows a path 324 from step 320 to step 326. It should be understood that this step 320 could alternatively be stated as determining whether vehicle autostops are inhibited, and if so, proceeding to step 308; if not, proceeding to step 326.

In step 326, the method 300 includes determining whether a CVT transmission autostop is inhibited. This step 326 may include considering such factors as: the automatic transmission fluid temperature range and the CVT gear ratio, by way of example. For example, the method 300 or system 100 may determine that transmission autostops are inhibited if the automatic transmission fluid temperature is outside of a predetermined fluid temperature range, or if the CVT gear ratio is outside a predetermined gear ratio range. Such information may come from another controller, by way of example. If the method 300 or system 100 determines that transmission autostops are inhibited in step 326, the method 300 follows a path 328 back to step 308, and the method 300 proceeds from step 308. If however, the method 300 or system 100 determines that transmission autostops are not inhibited, the method 300 follows a path 330 from step 326 to step 332. It should be understood that this step 326 could alternatively be stated as determining whether transmission autostops are allowed, and if so, proceeding to step 332; if not, proceeding to step 308.

In step 332, the method 300 includes allowing an engine autostop to happen. In step 332, a message may be sent to an appropriate controller, which may be part of the hydraulic control system 100, to allow autostops. In other words, the message states that the CVT transmission is ready for autostops. The message may be sent via a controller area network (CAN) signal, in one variation, though any other type of transmission is also acceptable. Thereafter, the engine may be stopped to increase efficiency.

Figure 3:
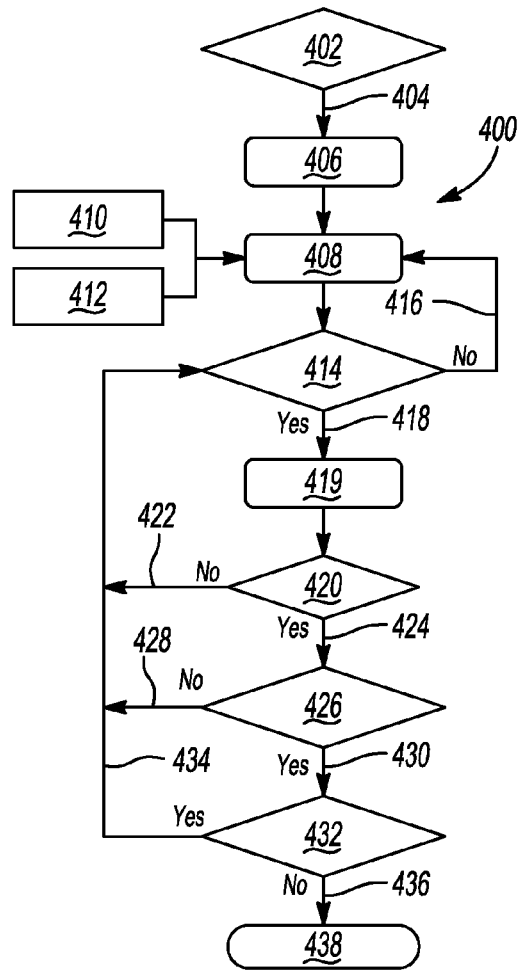
FIG. 3 is a block diagram illustrating steps of another method of operating the hydraulic control system of FIG. 1, or a variation thereof, according to the principles of the present disclosure.

Referring now to FIG. 3, another variation of a method 400 of enabling engine start/stop is illustrated and described in a flow chart. The method 400 may be implemented by the hydraulic control system 100, including through the use of one or more controllers, by way of example. The method 400 is intended to be used when it is desired to fill the accumulator 186 actively, such as through the accumulator solenoid 184. When the accumulator 186 is filled actively, the passive-fill valve 182 may be eliminated, if desired, or both active and passive filling of the accumulator 186 could be implemented through the accumulator solenoid 184 and the passive-fill valve 182.

The method 400 includes a step 402 of determining whether a pump output model indicates that the accumulator 186 can be filled. In step 402, the hydraulic control system 100 and method 400 determines whether the CVT clutches 260, 262, pulley sets 170, 176, and other components have sufficient hydraulic fluid pressure to run properly, and whether enough extra hydraulic fluid pressure is available to open the accumulator solenoid 184 and fill the accumulator 186. If opening the accumulator solenoid 184 would result in a pressure drop above a predetermined threshold in the clutches 262, 260, pulley sets 170, 176, or other components of the hydraulic control system 100, the method 400 and system 100 determine that the accumulator solenoid 184 cannot be opened and the accumulator 186 cannot be actively filled at the moment. The method 400 remains at step 402 until the pump output model indicates that the accumulator 186 can be filled.

If, in step 402, the pump output model indicates that the accumulator 186 can be filled, the method 400 proceeds along path 404. For example, if the pump output model indicates that active filling of the accumulator solenoid 186 would not result in a pressure drop above a predetermined threshold in the clutches 262, 260, pulley sets 170, 176, or other components of the hydraulic control system 100, the method 400 and system 100 proceed along path 404 to step 406 to allow the accumulator solenoid 184 to be turned on or opened. The pump output model could be configured to determine how much pressure is being produced by the pump and how much pressure is needed by the clutches 260, 262, pulley sets 170, 176, or other components, by way of example.

In step 406, the system 100 and method 400 includes turning on or opening the accumulator solenoid 184, which allows the accumulator 186 to be actively filled by the pump 118 through the accumulator solenoid 184. Then, the method 400 proceeds to step 408.

In step 408, the method 400 includes determining the stored volume in the accumulator 186. The stored volume in the accumulator 186 may be determined by determining the pressure at which the line pressure command is set (box 410) and determining the time at which the line pressure command is set (box 412), in addition to determining when the accumulator solenoid 184 is turned on. For example, if the accumulator 186 is filled passively through the one-way valve 182 and actively through the accumulator solenoid 184, an algorithm may determine the stored volume in the accumulator 186 by considering the pressure of the line pressure command and the time at which the line pressure command is set, as well as when the accumulator solenoid 184 is opened. In the alternative, the stored volume of the accumulator 186 could be determined in any other suitable manner, such as through use of a sensor (not shown). Based on the stored volume in the accumulator 186 determined in step 408, the system 100 or method 400 determines whether the accumulator 186 is filled in step 414.

If the accumulator 186 is not filled, the method 400 follows a path 416 back to step 408, wherein the method 400 or system 100 determines the accumulator stored volume 408, and then proceeds to step 414 as described above. If in step 414, the system 100 or method 400 determines that the accumulator 186 is filled, then the method 400 follows a path 418 to a step 419. In step 419, the system 100 or method 400 turns off the solenoid 184. Thereafter, the method proceeds to step 420. In the step 420, the method 400 includes determining whether a vehicle stop has been detected. The autostop only occurs if the vehicle has been stopped. If a vehicle stop has not been detected in step 420, the method 400 follows a path 422 back to step 414. If however, a vehicle stop has been detected in step 420, then the method 200 proceeds along a path 424 to a step 426.

In step 426, the method 400 includes determining whether a vehicle autostop is allowed. This step 426 is similar to step 320 described above, and may include considering such factors as: whether the cabin air conditioning is on, the ambient temperature range, the battery voltage or charge level, and vehicle speed, by way of example. For example, the method 400 or system 100 may determine that vehicle autostops are not allowed if the air conditioning is on, if the ambient temperature is outside of a predetermined temperature range, if the battery is not sufficiently charged, and/or if the vehicle is moving too fast. Such information may come from another controller, by way of example. If the method 400 or system 100 determines that vehicle autostops are not allowed in step 426, the method 400 follows a path 428 back to step 414, and the method 400 proceeds from step 414. If however, the method 400 or system 100 determines that vehicle autostops are allowed, the method 400 follows a path 430 from step 426 to step 432. It should be understood that this step 426 could alternatively be stated as determining whether vehicle autostops are inhibited, and if so, proceeding to step 414; if not, proceeding to step 432.

In step 432, the method 400 includes determining whether a CVT transmission autostop is inhibited, similar to the step 326 described above. This step 432 may include considering such factors as: the automatic transmission fluid temperature range and the CVT gear ratio, by way of example. For example, the method 400 or system 100 may determine that transmission autostops are inhibited if the automatic transmission fluid temperature is outside of a predetermined temperature range, or if the CVT gear ratio is outside a predetermined range. Such information may come from another controller, by way of example. If the method 400 or system 100 determines that CVT transmission autostops are inhibited in step 432, the method 400 follows a path 434 back to step 414, and the method 400 proceeds from step 414. If however, the method 400 or system 100 determines that CVT transmission autostops are not inhibited, the method 400 follows a path 436 from step 432 to step 438. It should be understood that this step 432 could alternatively be stated as determining whether transmission autostops are allowed, and if so, proceeding to step 438; if not, going back to step 414.

In step 438, the method 400 includes allowing an engine autostop to happen. In step 438, a message may be sent to an appropriate controller, which may be part of the hydraulic control system 100, to allow autostops. In other words, the message states that the CVT transmission is ready for autostops. The message may be sent via a controller area network (CAN) signal, in one variation, though any other type of transmission is also acceptable. Thereafter, the engine may be stopped to increase efficiency.

Figure 4:
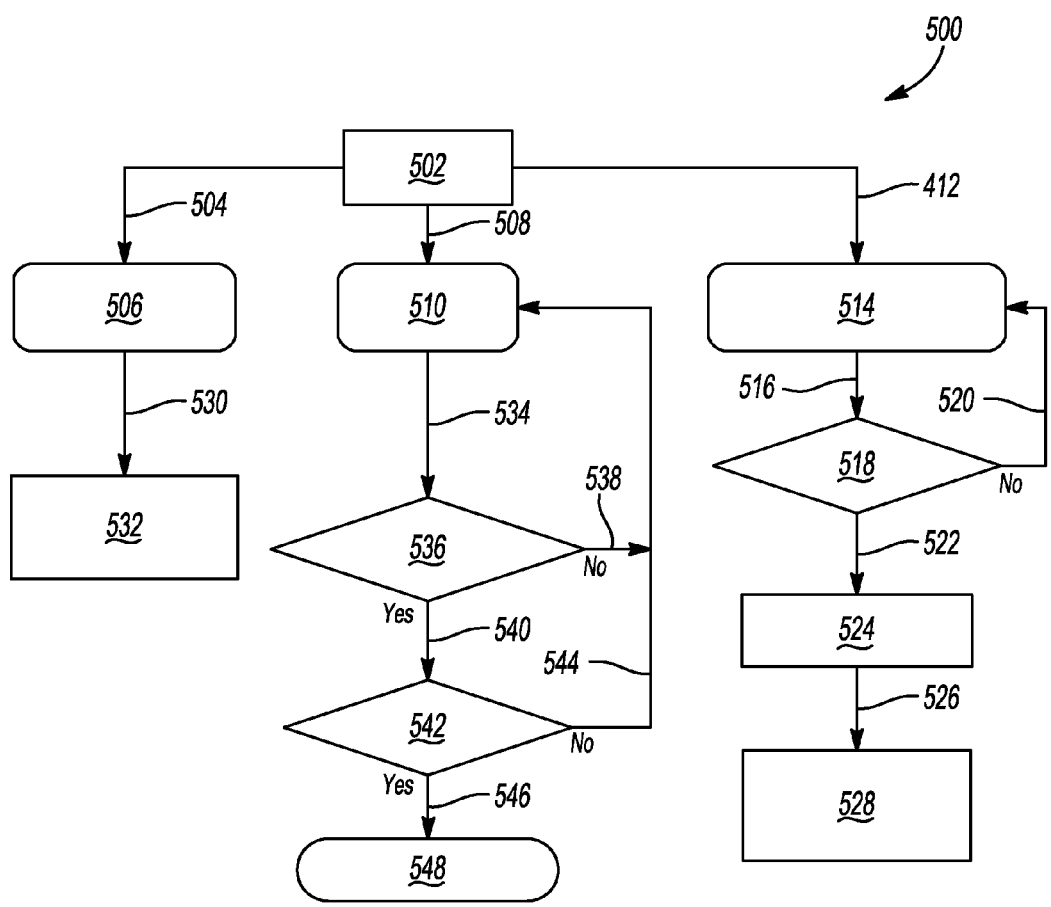
FIG. 4 is a block diagram illustrating steps of still another method of operating the hydraulic control system of FIG. 1, which may be combined with the methods of FIGS. 2-3, in accordance with the principles of the present disclosure.

After the autostop, at some point it will be desired to restart the engine to begin moving the vehicle. Thus, another method and control system for controlling the engine restart system are illustrated in FIG. 4 and generally designated at 500. The method 500 begins at step 501 where the controller 301 determines that an engine auto-stop event occurred. At step 502 the controller 301 receives an "engine on" or engine restart command. The engine on command is an electronic signal communicated from another controller, such as the ECM, indicating that the engine of the motor vehicle has been started.

After the engine on command is received in step 502, the method 500 proceeds along a path 504 to a step 506 of enabling a pulley pressure solenoid command, along a path 508 to a step 510 of enabling an accumulator solenoid on command, and along a path 512 to a step 514 of enabling a CVT clutch fill pressure solenoid command. The paths 504, 508, 512 may be proceeded along simultaneously or in a piecemeal fashion. The only caveat is that it is preferable to finish filling the pulley sets 170, 176 prior to finishing filling the clutch cavities of the clutches 260, 262 beyond volume fill capacity to gain torque capacity, which will be described in greater detail below.

The step 506 of enabling the pulley fill pressure solenoid command allows the pulley sets 170, 176 to be filled with hydraulic fluid pressure from the pump 118 and/or the accumulator 186. At step 506 the controller 301 commands the solenoid 174 to provide a first pulley target pressure to the first or primary moveable pulley 170 and commands the solenoid 180 to provide a second pulley target pressure to the second or secondary moveable pulley 176. The first and second pulley target pressures are determined based on a desired gear ratio, clamp force, etc.

The step 514 of enabling the CVT clutch fill pressure solenoid command allows the CVT clutches 260, 262 to be filled with hydraulic fluid pressure from the pump 118 and/or the accumulator 186. Initially, the clutches 260, 262 should be filled to fluid capacity, to the "kiss point", where the volume of fluid space in the cavity of the CVT clutches 260, 262 is filled, any further filling the clutch cavities would result in the clutch gaining torque capacity. It is preferable that the clutch regulator valve 276 and clutch control solenoid 174 regulate to a first clutch fill pressure for the clutch actuator 260 of the first or forward clutch or to regulate to a second clutch fill pressure for the clutch actuator 262 of the second or Reverse clutch or brake. The first and second clutch fill pressures are set such that there is no clutch capacity in the CVT clutches 260, 262. In the step 510, the accumulator solenoid command is turned on, which causes the accumulator solenoid 184 to open and the accumulator 186 to fire. Therefore, the pulleys 170, 176 and clutches 260, 262 may be brought up to pressure by both the accumulator 186 and the pump 118.

Once the clutches 260, 262 are filled to fluid capacity, but without gaining torque capacity, the method 500 proceeds along a path 516 from step 514 to step 518. In step 518, the method 500 includes determining whether the pulleys are filled by determining whether a first pulley actual pressure is equal to or greater than the first pulley target pressure and determining whether a second pulley actual pressure is equal to or greater than the second pulley target pressure. The actual pressures are the pressures of the hydraulic fluid acting within the pulleys 170, 176 and providing the clamping force. The pulleys of the CVT require a high enough pressure to ensure sufficient clamping forces for the belt and pulley mechanism, as slippage of the belt against the pulleys 170, 176 is often undesirable. The amount of clamping pressure required is a function of the input torque to the transmission and the ratio at which the variable transmission unit is operating. If the clamping pressure is low, there is a possibility of belt slippage. Accordingly, it is desirable to fill the pulleys 170, 176 prior to filling the clutches 260, 262 beyond fluid capacity to gain torque capacity. If the clutches are filled prior to the pulleys, the controller 301 commands the clutches to maintain the clutch target fill pressures.

If, in step 518, the method 500 and system 100 determine that the pulleys 170, 176 are not filled, the method 500 proceeds along a path 520 back to step 514. If however, the pulleys 170, 176 are filled, the method 500 proceeds along a path 522 from step 518 to step 524. In step 524, the controller 301 commands solenoid 274 to provide one of a first clutch engagement target pressure to the first clutch 260 or a second clutch engagement target pressure to the second clutch 262 if the first pulley actual pressure is equal to or greater than the first pulley target pressure and the second pulley actual pressure is equal to or greater than the second pulley target pressure. The first clutch engagement target pressure is defined as a pressure in the first clutch 260 sufficient to engage and transmit torque through the first clutch 260 and the second clutch engagement target pressure is defined as a pressure in the second clutch 262 sufficient to engage and transmit torque through the second clutch 262. Thereafter, the method 500 may proceed along path 526 from step 524 to step 528. In step 528, the method 500 includes implementing a regular CVT clutch control algorithm that is used during normal operation of the CVT. Similarly, after the pulleys are filled via step 506, the method 500 may proceed along path 530 from step 506 to step 532. In step 532, the method 500 includes implementing a regular CVT pulley control algorithm that is used during normal operation of the CVT.

Along its other route, after the accumulator solenoid 184 is turned on in step 510, the method 500 proceeds along a path 534 from step 510 to step 536. In step 536, the method 500 includes determining whether the pulleys 170, 176 and the clutches 260, 262 are filled. If the pulleys 170, 176 and the clutches 260, 262 are not filled, the method 500 proceeds along a path 538 from step 536 back to step 510. If, however, the pulleys 170, 176 and the clutches 260, 262 are filled, the method 500 proceeds along a path 540 to a step 542.

In step 542, the method 500 includes determining whether the engine is up to idle speed. If the engine is not up to idle speed, the method 500 proceeds along a path 544 back to step 510. If, however, the engine is up to idle speed, the method 500 proceeds along a path 546 from step 542 to step 548. In step 548, the method 500 includes turning off the accumulator control solenoid 184 to close the accumulator control solenoid 184. Normal operation of the CVT transmission and hydraulic control system 100 ensues.

It should be appreciated that other orifice and check ball arrangements can be used without departing from the scope of present invention, including a single orifice for fill and exhaust, or filling through a single orifice and exhausting through two orifices. Likewise while individual fluid lines have been described, it should be appreciated that fluid lines, flow paths, passageways, etc., may contain other shapes, sizes, cross-sections, and have additional or fewer branches without departing from the scope of the present invention.

The description of the invention is merely exemplary in nature and variations that do not depart from the general essence of the invention are intended to be within the scope of the invention. Such variations are not to be regarded as a departure from the spirit and scope of the invention.

The following is claimed:

1. A continuously variable transmission comprising:
   a hydraulic control system;
   a pump driven by the engine for supplying a pressurized hydraulic fluid to the hydraulic control system;
   a first pulley pair with a first moveable pulley;
   a second pulley pair with a second moveable pulley;
   a first torque transmitting device;
   a second torque transmitting device; and
   a controller having a preprogrammed digital computer and memory for storing control logic, the control logic including a first control logic for commanding a first pulley target pressure to the first moveable pulley, a second control logic for commanding a second pulley target pressure to the second moveable pulley, a third control logic for commanding one of a first torque transmitting device fill target pressure to the first torque transmitting device or a second torque transmitting device fill target pressure to the second torque transmitting device, a fourth control logic for determining whether a first pulley actual pressure is equal to or greater than the first pulley target pressure, a fifth control logic for determining whether a second pulley actual pressure is equal to or greater than the second pulley target pressure, and a sixth control logic for commanding a first torque transmitting device engagement target pressure to the first torque transmitting device or a second torque transmitting device engagement target pressure to the second torque transmitting device if the first pulley actual pressure is equal to or greater than the first pulley target pressure or the second pulley actual pressure is equal to or greater than the second pulley target pressure.

2. The continuously variable transmission of claim 1 wherein the controller further includes a seventh control logic for holding either the first torque transmitting device at the first torque transmitting device fill target pressure or the second torque transmitting device at the second torque transmitting device fill target pressure until the first pulley actual pressure is equal to or greater than the first pulley target pressure or the second pulley actual pressure is equal to or greater than the second pulley target pressure.

3. The continuously variable transmission of claim 2 wherein the first torque transmitting device fill target pressure is defined as a pressure in the first torque transmitting device insufficient to engage and transmit torque through the first torque transmitting device and the second torque transmitting device fill target pressure is defined as a pressure in the second torque transmitting device insufficient to engage and transmit torque through the second torque transmitting device.

4. The continuously variable transmission of claim 3 wherein the first torque transmitting device engagement target pressure is defined as a pressure in the first torque transmitting device sufficient to engage and transmit torque through the first torque transmitting device and the second torque transmitting device engagement target pressure is defined as a pressure in the second torque transmitting device sufficient to engage and transmit torque through the second torque transmitting device.

5. The continuously variable transmission of claim 4 wherein the first pulley actual pressure is a pressure of hydraulic fluid acting on the first moveable pulley and the second pulley actual pressure is a pressure of hydraulic fluid acting on the second moveable pulley.

6. A system in a motor vehicle comprising:
   an engine;
   a continuously variable transmission having:
     a hydraulic control system;
     a pump driven by the engine for supplying a pressurized hydraulic fluid to the hydraulic control system;
     an accumulator;
     a first pulley pair with a first moveable pulley;
     a second pulley pair with a second moveable pulley;
     a first clutch;
     a second clutch; and
     a controller having a preprogrammed digital computer and memory for storing control logic, the control logic including a first control logic for receiving an engine on command, a second control logic for commanding the accumulator to open if the engine on command has been received by the controller, a third control logic for commanding a first pulley target pressure to the first moveable pulley, a fourth control logic for commanding a second pulley target pressure to the second moveable pulley, a fifth control logic for commanding one of a first clutch fill target pressure to the first clutch or a second clutch fill target pressure to the second clutch, a sixth control logic for determining whether a first pulley actual pressure is equal to or greater than the first pulley target pressure, a seventh control logic for determining whether a second pulley actual pressure is equal to or greater than the second pulley target pressure, and an eighth control logic for commanding one of a first clutch engagement target pressure to the first clutch or a second clutch engagement target pressure to the second clutch if the first pulley actual pressure is equal to or greater than the first pulley target pressure and the second pulley actual pressure is equal to or greater than the second pulley target pressure.

7. The system of claim 6 further comprising a ninth control logic for holding either the first clutch at the first clutch fill target pressure or the second clutch at the second clutch fill target pressure until the first pulley actual pressure is equal to or greater than the first pulley target pressure and the second pulley actual pressure is equal to or greater than the second pulley target pressure.

8. The system of claim 6 wherein the first clutch fill target pressure is defined as a pressure in the first clutch insufficient to engage and transmit torque through the first clutch and the second clutch fill target pressure is defined as a pressure in the second clutch insufficient to engage and transmit torque through the second clutch.

9. The system of claim 6 wherein the first pulley actual pressure is a pressure of hydraulic fluid acting on the first moveable pulley and the second pulley actual pressure is a pressure of hydraulic fluid acting on the second moveable pulley.

10. The system of claim 6 further comprising a tenth control logic for commanding the accumulator to close if the engine has reached an idle speed and the first pulley actual pressure is equal to or greater than the first pulley target pressure, the second pulley actual pressure is equal to or greater than the second pulley target pressure, and one of the first clutch engagement target pressure is greater than or equal to a first clutch engagement actual pressure and the second clutch engagement target pressure is equal to or greater than a second clutch engagement actual pressure.

11. The system of claim 6 further comprising:
an eleventh control logic for determining an accumulator stored volume;
a twelfth control logic for determining whether the accumulator stored volume is equal to an accumulator fill volume;
a thirteenth control logic for determining whether a motor vehicle stop has occurred;
a fourteenth control logic for determining whether an engine auto-stop is allowed based on motor vehicle conditions;
a fifteenth control logic for determining whether to inhibit the engine auto-stop based on transmission conditions; and
a sixteenth control logic for commanding an engine auto-stop if the accumulator stored volume is equal to the accumulator fill volume, the motor vehicle has stopped, the engine auto-stop is allowed, and the engine auto-stop has not been inhibited.

12. The system of claim 11 wherein the motor vehicle conditions include a cabin air conditioning status, an ambient temperature range, a battery voltage or charge level, an accumulator stored volume less than the accumulator fill volume, and a vehicle speed.

13. The system of claim 12 wherein the engine auto-stop is prohibited if the cabin air conditioning is on, the ambient temperature is outside of a predetermined ambient temperature range, the battery is not sufficiently charged, or the vehicle speed exceeds a speed threshold.

14. The system of claim 11 wherein the transmission conditions include a fluid temperature of the hydraulic fluid and a gear ratio of the continuously variable transmission.

15. The system of claim 11 wherein the engine auto stop is inhibited if the temperature of the hydraulic fluid is outside of a predetermined temperature range or the continuously variable transmission gear ratio is outside a predetermined ratio range.

16. The system of claim 11 further comprising a seventeenth control logic for determining whether a pump output model indicates that the accumulator can be actively filled without compromising hydraulic control system performance.

17. The system of claim 15 wherein the first clutch engagement target pressure is defined as a pressure in the first clutch sufficient to engage and transmit torque through the first clutch and the second clutch engagement target pressure is defined as a pressure in the second clutch sufficient to engage and transmit torque through the second clutch.

18. The system of claim 16 wherein the first control logic of commanding the accumulator to open if the engine on command has been received by the controller includes commanding the accumulator to open if the pump output model indicates that the accumulator can be actively filled.

19. A system in a motor vehicle comprising:
an engine;
a pump driven by the engine;
a continuously variable transmission having:
    an accumulator;
    a first pulley pair with a first moveable pulley;
    a first valve in fluid communication with the first moveable pulley for controlling a position of the first moveable pulley;
    a first solenoid for controlling a position of the first valve;
    a second pulley pair with a second moveable pulley;
    a second valve in fluid communication with the second moveable pulley for controlling a position of the second moveable pulley;
    a second solenoid for controlling a position of the second valve;
    a torque transmitting mechanism;
    a third valve in fluid communication with the torque transmitting mechanism for controlling a torque carrying capacity of the torque transmitting mechanism;
    a third solenoid for controlling a position of the third valve; and
    a controller having a preprogrammed digital computer and memory for storing control logic, the control logic including a first control logic for commanding an engine auto-stop, a second control logic for commanding an engine restart command after the engine auto-stop has been commanded, a third control logic for commanding the accumulator to open after the engine restart has been commanded, a fourth control logic for commanding the first solenoid to control the first valve to provide a first pulley target pressure to the first moveable pulley, a fifth control logic for commanding the second solenoid to control the second valve to provide a second pulley target pressure to the second moveable pulley, and a sixth control logic for commanding the third solenoid to control the third valve to provide an engagement target pressure to the torque transmitting mechanism if a first pulley actual pressure is equal to or greater than the first pulley target pressure and a second pulley actual pressure is equal to or greater than the second pulley target pressure.

20. The system of claim 19 further comprising a seventh control logic for commanding the accumulator to close if the engine has reached an idle speed and the first pulley actual pressure is equal to or greater than the first pulley target pressure, the second pulley actual pressure is equal to or greater than the second pulley target pressure, and the engagement target pressure is greater than or equal to an engagement actual pressure.

* * * * *